United States Patent
Hadley

(10) Patent No.: US 7,255,549 B2
(45) Date of Patent: Aug. 14, 2007

(54) CONTROL OF RESIN FLOW DURING MOLDING OF COMPOSITE ARTICLES

(75) Inventor: Philip C. Hadley, Ely (GB)

(73) Assignee: Hexcel Composites, Ltd., Duxford (GB)

( * ) Notice: Subject to any disclaimer, the term of this patent is extended or adjusted under 35 U.S.C. 154(b) by 596 days.

(21) Appl. No.: 10/733,609

(22) Filed: Dec. 10, 2003

(65) Prior Publication Data

US 2004/0140587 A1 Jul. 22, 2004

(30) Foreign Application Priority Data

Dec. 13, 2002 (GB) ................................ 0229094.8

(51) Int. Cl.
*B29C 70/48* (2006.01)
(52) U.S. Cl. .............................. 425/129.1; 264/328.12; 425/389
(58) Field of Classification Search ............. 425/129.1, 425/389; 264/328.12
See application file for complete search history.

(56) References Cited

U.S. PATENT DOCUMENTS

| | | | |
|---|---|---|---|
| 4,101,459 A | 7/1978 | Andrews | |
| 4,668,736 A | 5/1987 | Robins et al. | |
| 4,873,044 A | 10/1989 | Epel | |
| 4,880,583 A | 11/1989 | Douglas | |
| 4,942,013 A * | 7/1990 | Palmer et al. | ............... 264/511 |
| 4,952,135 A | 8/1990 | Douglas | |
| 5,198,146 A | 3/1993 | Shomer | |
| 5,442,035 A | 8/1995 | Corley et al. | |
| 5,443,778 A * | 8/1995 | Schlingman | ................ 264/257 |
| 5,665,301 A * | 9/1997 | Alanko | ........................ 264/571 |
| 5,958,593 A | 9/1999 | Shomer | |
| 6,627,142 B2 * | 9/2003 | Slaughter et al. | ............ 264/510 |
| 6,818,159 B2 * | 11/2004 | Hinz | .......................... 264/40.6 |
| 6,911,175 B2 * | 6/2005 | Benson et al. | ............... 264/510 |
| 2002/0149134 A1 * | 10/2002 | Hemphill et al. | ........... 264/255 |

FOREIGN PATENT DOCUMENTS

| | | | |
|---|---|---|---|
| EP | 1428650 A1 * | 6/2004 | |
| WO | WO 03/006766 A1 | 1/2003 | |

OTHER PUBLICATIONS

Pfund, B, "Resin Infusion in the US Marine Industry", Reinforced Plastics, Elsevier Advanced Technology, NY, NY, US, vol. 38, No. 12, Dec. 1994, pp. 32-34.*
Butler, D., Engel, R.S., "On the Use of Embedded Graphite Patches for Cure in Resin Transfer Molding," Proceedings of ICCM-10, Whistler, B.C., Canada, Aug. 1995 (pp. 269-276).
Baaklini, G., Lebowitz, C.A., Boltz, E.S., "Nondestructive Evaluation of Aging Materials and Composites IV," Proceedings of SPIE vol. 3993 (2000) (pp. 19-22).

\* cited by examiner

*Primary Examiner*—Robert B. Davis
(74) *Attorney, Agent, or Firm*—W. Mark Bielawski; David J. Oldenkamp

(57) ABSTRACT

The flow of resin during the molding of composite articles is controlled by forming areas of immobilized resin during the infusion of resin into the fibrous body. The immobilized resin is formed using an immobilization agent that interacts with the infused resin to form a high viscosity resin barrier that is effective in blocking the flow of non-immobilized resin. The barriers of immobilized resin are located within the fibrous body so as to control the flow of non-immobilized resin during the molding process to prevent or least reduce resin depletion and to selectively block resin flow from the mold.

22 Claims, 6 Drawing Sheets

CONTROL OF RESIN FLOW DURING MOLDING OF COMPOSITE ARTICLES

BACKGROUND OF THE INVENTION

1. Field of the Invention

The present invention relates to methods for making fiber-reinforced composite articles where uncured resin is infused into a fibrous body located in a mold to form an uncured resin impregnated fibrous body that is then cured. More particularly, the present invention involves controlling the flow of resin during the molding process to prevent or at least reduce unwanted flow or migration of the resin within the fibrous body and mold.

2. Description of Related Art

Fiber-reinforced composites are widely used to form structures and components for use in a range of different industries including, for example, the aerospace, transport, electronics, building and leisure industries.

A common approach for the preparation of such structures or components, especially large structures or components such as boat hulls, wind turbine blades, or certain aircraft components, involves the arrangement of a fibrous reinforcement assembly within a mold followed by the impregnation or infusion of the assembly with a mixture of one or more liquid resins with one or more curing agents. Once the impregnation or infusion of the liquid resin/curing agent mixture into the assembly is complete, the liquid resin is then cured to yield the final molded structure or component. Curing is typically accomplished by heating the assembly.

There are a number of different techniques by which a resin/curing agent mixture may be infused or impregnated into the fibrous reinforcement assembly. Conventional techniques involve either brushing or metering the resin/curing agent mixture onto the fibrous reinforcement. Although such techniques are simple and relatively inexpensive to implement in practice, the resultant product can be variable in quality and the mechanical properties of the final structure or component can often be poor.

More recently, liquid resin infusion technologies, such as resin transfer molding (RTM), vacuum-assisted resin transfer molding (VaRTM) and resin infusion using flexible tooling (RIFT), have been developed. All of these technologies rely on the basic concept of injecting or infusing the resin into the fibrous reinforcement assembly, either in a closed mold in the case of an RTM process, or in a vacuum bag molding in the case of a VaRTM process. These processes carry numerous advantageous over the conventional techniques by virtue of the improved hygiene and safety with which these mainly enclosed processes can be carried out, the favorable mechanical properties of the final composite component or structure, and favorable manufacture costs.

When preparing fiber-reinforced components by a liquid resin infusion process, it has been observed that there is a tendency for the liquid resin infused into the fibrous reinforcement assembly to become depleted within certain areas of the assembly during infusion and cure. This occurrence is especially common when a vacuum resin infusion process is used to prepare large components, such as a wind turbine blade or boat hull, for example. Resin depletion is also a problem when the liquid resin infused into the fibrous reinforcement assembly is of particularly low viscosity. Low viscosity resins provide a number of particular benefits including relatively high infusion speed, for example. The occurrence of resin depletion can be particularly disadvantageous because the final structure or component formed following the cure of the liquid resin does not contain the originally intended distribution of resin throughout its structure. As a consequence, the mechanical properties and performance of the structure or component thus formed can be compromised, particularly in the regions where resin depletion has occurred. The occurrence of resin depletion can often be visualized by the presence of white patches on the surface of glass-reinforced components. These may appear during infusion or may only become apparent following curing.

In the case of a VaRTM process, for example, the areas of the assembly that have been observed to be particularly prone to the occurrence of resin depletion include the areas in the vicinity of the suction tubing that connects the vacuum pump to the mold. In these areas, resin depletion tends to occur as a result of the suction force generated by the vacuum pump. Resin depletion can also result from the effect of gravity in areas that are in contact with vertically inclined sections of the mold. Resin depletion in these areas is especially likely to occur once all the interstices between fibers of the fibrous reinforcement have become fully saturated with the infused liquid resin. Furthermore, the support pressure applied to the assembly by the vacuum bag is typically less than 1 bar (100 kPa), which in itself is insufficient to prevent the liquid resin flowing out of the vertically inclined sections of the composition under the force of gravity.

If the resin is an epoxy resin, the problem is further exacerbated when the assembly is heated to cause the resin to cure because the viscosity of the epoxy resins can decrease significantly during the cure cycle. Although common to other resin systems, liquid epoxy resins are less likely to be able to counteract this viscosity decrease by a rapid gelation and cure mechanism.

This temporarily unchecked reduction in viscosity, particularly when coupled with the fact that it is often necessary to maintain the vacuum suction to the assembly once the resin infusion is complete and also during the cure cycle, further increases the tendency for the resin depletion to occur, particularly in susceptible areas.

One approach to solve this problem is to use a very rapid curing system; the gel time for formulated epoxy resin infusion systems can be reduced to just a few minutes or, in some cases, even less. However, this can impact severely on the viscosity of the composition during the infusion process, and the safety of the operation, such high reactivity often being accompanied by high exothermic heat generation.

It is an object of the present invention, therefore, to provide a process and composition for the preparation of a fiber-reinforced composite structure or component by a resin infusion process in which depletion of resin in areas that are prone to resin depletion is significantly decreased or eliminated altogether.

SUMMARY OF THE INVENTION

In accordance with the present invention methods and assemblies are provided that control the flow of resin during molding of composite structures to eliminate or at least substantially reduce resin depletion and other unwanted resin migration. The invention is based, at least in part, on the use of barriers that are formed in situ at selected locations during the molding process. Once formed, the barriers provide a way to prevent flow of resin into or out of certain areas within the composite structure and/or mold apparatus.

The present invention covers assemblies for use in making fiber-reinforced composite articles involving methods where an uncured resin having a given viscosity is infused into a fibrous body to form an uncured resin impregnated fibrous body that is then cured to form the fiber-reinforced composite article. The assembly includes a mold that has a surface which includes a first location and a second location. The assembly further includes a fibrous body having a side that is located adjacent to the surface of the mold wherein the side of the fibrous body extends from the first location to the second location. As a feature of the invention, an immobilization agent is located between the first and second locations. The immobilization agent is present in a sufficient amount to increase the viscosity of the infused resin to form an immobilized resin barrier when the resin contacts the immobilization agent. This in situ formed resin barrier is sufficiently large to restrict the flow of the resin between the first and second locations.

The immobilized resin barriers may be formed in a wide variety of locations and in a wide variety of configurations to provide an extremely versatile way of controlling resin flow during the molding process. The barriers may be formed to prevent resin depletion from selected areas of the fibrous body due to gravity or vacuum. In addition, the barriers may be placed adjacent to resin outlets in the mold to effectively close off the outlet once the area adjacent to the outlet has been saturated with resin.

The present invention provides an improved method for making fiber-reinforced composite articles where an uncured resin having a given viscosity is infused into a fibrous body to form an uncured resin impregnated fibrous body that is then cured to form said fiber-reinforced composite article. The improvement involves controlling the flow of resin within the fibrous body by introducing the above-mentioned immobilization agent into said fibrous body at one or more selected locations. The immobilization agent is introduced in sufficient amounts at the one or more selected locations to increase the viscosity of at least a portion of the infused resin to form one or more immobilized resin barriers. The resin barriers that are formed are sufficiently large and strategically located to restrict the flow of the resin within said fibrous body.

The in situ formation of high viscosity barriers to control resin flow in accordance with the present inventions provides a number of advantages. For example, resin flow is controlled in two ways. First, the resin that is converted into a high viscosity resin or gel is effectively immobilized. Second, the immobilized resin forms an effective barrier that is useful in controlling the flow of less viscous resin present in the fibrous body. In addition, the barriers are not immediately formed so that initial resin infusion past the barriers is not restricted. Another advantage is that by using the resin itself as the barrier, the inclusion of any foreign material into composite is eliminated.

The above discussed and many other features and attendant advantages of the present invention will become better understood by reference to the detailed description when taken in conjunction with the accompanying drawings.

DETAILED DESCRIPTION OF THE INVENTION

Figure 1:
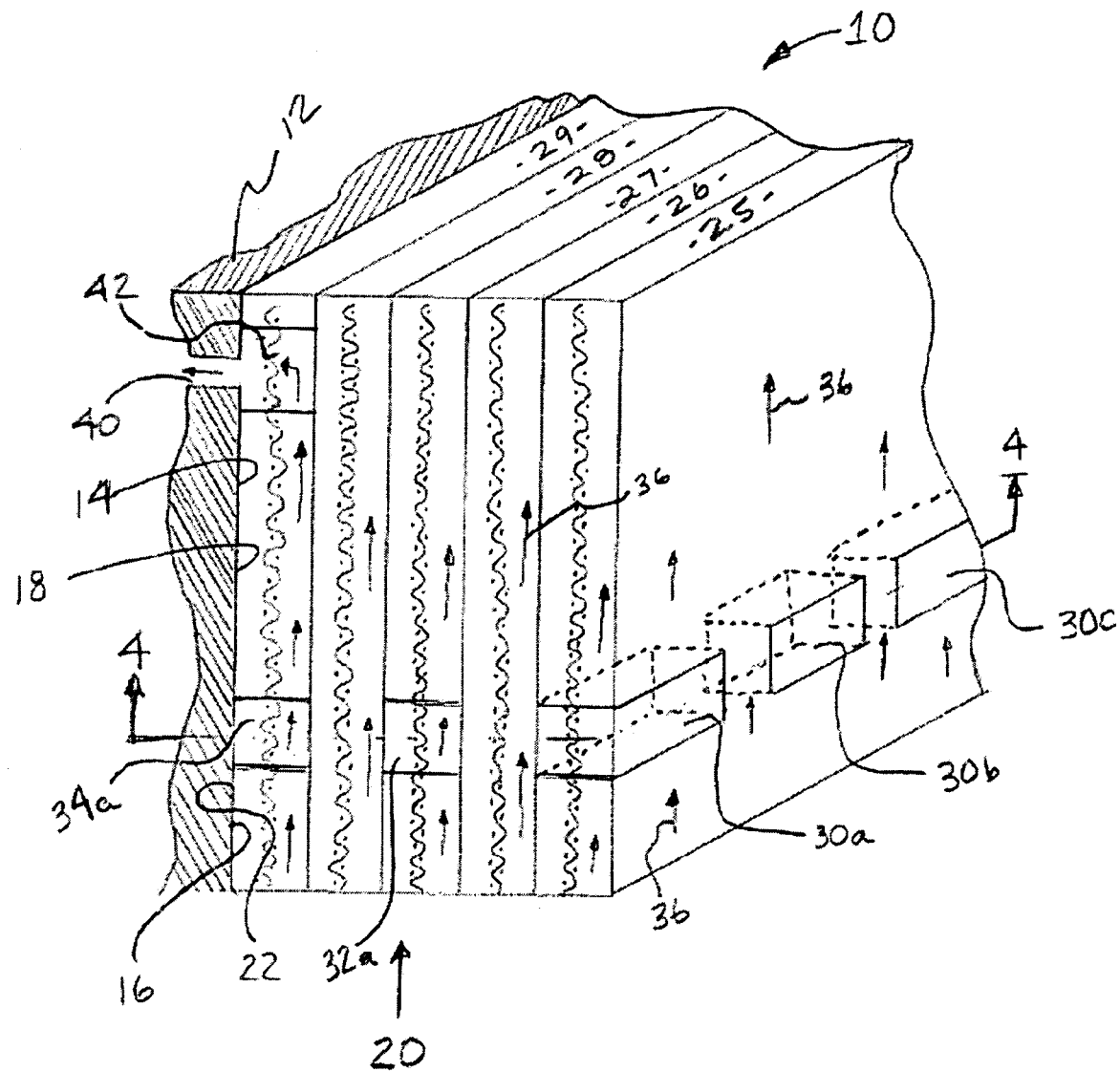
FIG. 1 is a simplified side view of a portion of an exemplary assembly in accordance with the present invention showing the immobilization agent in place within the fibrous body at the start of resin infusion.

The problem of resin depletion that is observed to occur following the preparation of a fiber-reinforced composite structure or component by a resin infusion process is solved by the present invention by the selective positioning of the immobilization agent in the areas of the assembly that are prone to resin depletion (i.e. vertically inclined sections of the mould or, in a VaRTM process for example, the areas surrounding the vacuum tubing), thereby enabling the formation of a final cured structure or component having a substantially uniform distribution of resin throughout its structure. It will be appreciated that the localized immobilization of the liquid resin in the vicinity of the immobilization agent prevents, or at least substantially reduces, the tendency for resin to flow out of these areas, whether under the force of gravity or by any other driving force.

In addition to providing a solution to the problem of resin depletion, there may also be instances where the controllable localized immobilization of the resin may be used to achieve other desired effects, such as, for example, to close off or block a suction tube connection between the vacuum pump and the mold assembly in a VaRTM process for example. This effect is desirable to facilitate the controlled infusion of the resin into the assembly and is achieved by the placement of an immobilization agent in the vicinity of the opening of a vacuum suction tube so that once the resin reaches the immobilization agent and the localized immobilization of the infused resin is achieved, then that suction tube will become effectively closed off or blocked. This effect can be used to sequentially close a number of different suction tubes as the liquid resin gradually infuses into different regions of the assembly, thereby enabling the vacuum suction to become gradually more concentrated in the remaining areas of the assembly where complete infusion has not been achieved. Known methods by which the localized immobilization of a liquid resin within the assembly can be achieved by the direction of heat to localized areas of a prepreg composition, thereby promoting the cure of the resin in that locality, are described in Butler et al., Proc. Int. Conf. Compos. Mater., 10$^{th}$ (1995), Volume 3, 269-276 and Shull et al., Proceedings of SPIE—The International Society for Optical Engineering, (2000), 3993, 19-22. In such processes, however, the possibility exists for thermal transfer to promote the cure of resin beyond the localized areas desired. Where the resin system is formulated to be highly reactive, i.e. when a rapid cure at low temperatures is desired, for example, then the possibility exists for promotion of the cure reaction via exothermic enhancement. Unless measures are taken to limit this, there is the potential for the cure of the resin to be promoted throughout larger areas of the composition, particularly in thick sections of the assembly. In contrast, some of the compositions and processes of the invention described herein, do not rely on vigorous reaction chemistry to achieve localized immobilization of resin, thus removing the problem of unwanted exothermic enhancement.

In the present invention the expression 'immobilization agent' is used herein to denote an agent or combination of agents that are capable causing the localized immobilization of the liquid resin as it is infused into the fibrous reinforcement body. The immobilization is preferably achieved by a physicochemical process where the viscosity of the liquid resin is increased to form a gel or other high viscosity resin barrier on or within the assembly to prevent or impede resin flowing out of a selected region of the assembly.

Although any number of immobilization agents may be used to form the resin barriers, the preferred immobilization agent will include a so-called 'accelerator agent' which, when infused with a liquid resin/curing agent mixture causes the formation of a gel or other highly viscous material that forms an effective barrier to the flow of less viscous resin. This reaction of the accelerator agent and the resin/curing agent mixture increases the viscosity by inducing the localized gelling of the liquid resin, thereby preventing the liquid resin from flowing freely in the region where the immobilization agent is applied and thus, can be used to prevent the occurrence of resin depletion.

The reaction of the liquid resin/curing agent mixture with the accelerator agent does not necessarily result in the full cure of the resin in the vicinity of the immobilization agent. It is merely required that the viscosity of the liquid resin is increased to a sufficient extent to prevent its flow and, hence, its depletion, from the vicinity of the immobilization agent. The full cure of the immobilized region can occur by the continued reaction between the resin and the curing agent, often at elevated temperature. Alternatively, the accelerator agent applied in this region may also be involved in this continued reaction.

The accelerator agent may be applied either directly onto and/or impregnated within the surface of the fibrous reinforcement body or, where the body is composed of a number of sheets or plies of a fibrous reinforcement material, the accelerator agent may be applied onto and/or impregnated within some or all of those individual sheets or plies. The latter form of application is particularly desirable when a comprehensive immobilization of the liquid resin throughout the fibrous body is desired at a given location.

As the liquid resin/curing agent mixture infuses into the fibrous reinforcement body or assembly, the accelerator agent might become dispersed into the surrounding area. This being the case, it is anticipated that the use of the accelerator agent would be most appropriate in areas of the assembly where the rate of resin flow through the assembly is low during the infusion process. In practice, most of the areas of the assembly that are prone to resin depletion and hence, where the immobilization of the liquid resin is desired, are located around the periphery of the assembly where the assembly is typically thinner and the rate of resin flow is typically low. Accordingly, in these areas, the dispersion and dilution of the accelerator agent into the surrounding area by the flow of the infusing resin/curing agent mixture will be limited.

Preferably, the localized reaction between the accelerator agent and the liquid resin/curing agent mixture occurs at a time nearing the end of the resin infusion when the flow rate is low.

In the case of infusion processes where rapid flow of the liquid resin/curing agent mixture across the surface of the lower surface of the assembly is encouraged before permeating towards the mold surface, the immobilization agent is preferably applied to a number of plies throughout the thickness of the fibrous reinforcement assembly, rather than just on the surface of the assembly.

In the case of VaRTM processes, the immobilization agent can be applied to the fibrous reinforcement prior to evacuating the assembly and infusing the fibrous reinforcement with the liquid resin/curing agent mixture.

Although immobilization agents composed of a neat application of an accelerator agent onto the fibrous reinforcement assembly is generally preferred, some additional components may be included with the accelerator agent to assist in the immobilization of the accelerator within and/or on the surface of the fibrous reinforcement. An example of one such additional component that may be used is a thixotropic material such as fumed silica available from Cabot Corporation under the tradename Cabosil® or from Degussa Ltd. under the tradename Aerosil®.

Where the loading of neat accelerator agent at any given location is likely to give a local accelerator concentration that is too high, then the accelerator can be dissolved in a solvent that can be flashed off later. It is important that any carrying solvent is removed completely prior to infusion of the resin. This can be done using heat and/or vacuum processes. It will be clear to a person skilled in the art that such a technique may be carried out during a vacuum resin infusion process by the evacuation of the assembly prior to resin infusion if the accelerator is supplied as a solution. Furthermore, the supply of a solution of the accelerator may facilitate application of the accelerator to the fibrous reinforcement by a suitable spraying or painting technique by the molder. It may then be appropriate for the carrying solvent to be removed as described above, relying on the use of the vacuum normally associated with drawing the liquid resin into the assembly. However, any limitations imposed by the activity of the accelerator need to be taken into account.

It is preferred, however, that the accelerator agent is applied to the fibrous reinforcement assembly in the form of a so-called "accelerator-preg". By "accelerator-preg", we mean a patch or strip of a suitable carrier substrate which is impregnated with an accelerator agent.

The "accelerator-preg" may be supplied separately as patches or strips of carrier substrate which have been pre-impregnated with the accelerator agent. Hence, according to a further aspect of the present invention, there is provided an "accelerator-preg" suitable for placement on and/or within a fibrous reinforcement assembly comprising a carrier substrate impregnated with an accelerator agent as herein defined.

The use of an "accelerator-preg" is particularly advantageous because it obviates the requirement for the molder to handle the accelerator agent directly. As for the application of the accelerator agent directly onto the fibrous reinforcement as discussed above, it is preferred that the carrier substrate is impregnated with neat accelerator, but it may be necessary in some cases to add additional components (e.g. Cabosil®) to assist the immobilization of the accelerator either within or on the surface of the carrier substrate.

Any suitable carrier substrate may be used for the preparation of an "accelerator-preg". Suitable examples include textile materials, especially lightweight fabrics and scrims of natural or synthetic fibres such as nylon, polyester, cotton glass or carbon fiber in stitched, knitted, woven or mat form. Accordingly, the carrier substrate of the "accelerator-preg" could either be the same material as the fibrous reinforcement body or different. In most cases, an "accelerator-preg" will be applied to thin sections of the fibrous reinforcement. In such cases, a sufficient quantity of the accelerator is impregnated onto a lightweight fabrics material such as, for example, the scrims or carriers often used in adhesive technology. These very lightweight impregnated articles are especially suited for inclusion in many areas of, for example, a wind turbine blade lay-up or a boat hull, because their effect on the performance of the final component is likely to be negligible. The "accelerator-preg" may be applied onto the surface of the fibrous reinforcement or, alternatively, where the fibrous reinforcement is composed of a number of plies or sheets of reinforcement material, the "accelerator-preg" may be applied in between some or all of those plies or sheets. The latter from of application is particularly desirable when a comprehensive immobilization of the resin throughout the entire thickness of the fibrous reinforcement assembly is required. In some cases, it may be preferable to stagger the "accelerator-pregs" applied between the respective sheets or plies of the fibrous reinforcement so that a gradual and controlled increase in the viscosity of the resin is imparted as the resin infuses through the assembly. This is especially desirable in thick sections of the assembly, where the resin flow is likely to be high.

The accelerator agent can be applied to the carrier substrate of the "accelerator-preg" in a solvent, as described above in relation to the application of the accelerator directly to the fibrous reinforcement body or assembly. In such cases, the solvent impregnation and subsequent solvent removal could form part of the "accelerator-preg" manufacturing process.

The carrier substrate may be secured to the fibrous reinforcement assembly using a small stitch or knot of glass fiber, in a similar manner to the way in which the various plies of the fibrous reinforcement assembly are typically secured to each other. Experimentation will determine the optimal positioning for these patches for each application, both in the x-y plane (in the plane of the reinforcement) and in the z plane (through the assembly). The precise positioning is likely to be unique for each lay up.

Preferably, the "accelerator-preg" is colored in an easily distinguishable manner to distinguish it from the rest of the fibrous reinforcement, unless aesthetic appearance is important where it may carry the color (or lack of color) of the rest of the fibrous reinforcement. In the former case, a shade of red is considered to be particularly suitable for adequately conveying the enhanced reactivity of that particular part of the assembly.

As the resin is infused into the fibrous reinforcement assembly and encounters the accelerator agent, the curing process is accelerated and the viscosity of the liquid resin will increase much quicker than other areas where no accelerator agent is present. Depending on the exact nature of the accelerator chosen, heat may be evolved rapidly and suitable allowance should be made for this eventuality as necessary. However, as the main application of these accelerator agents will primarily be in thin vertical sections of the fibrous reinforcement assembly where resin depletion is most likely to occur, this reaction enthalpy should be dissipated quickly and should cause few problems. However, significant thermal conduction may also promote the cure of the non-accelerated region of adjacent resin, as described earlier, which may or may not be desirable.

The accelerator agent selected, whether for direct application to the fibrous reinforcement assembly or for pre-impregnation onto or within an "accelerator-preg", will depend on the specific resin/curing agent mixture present in the composition. For any given resin/curing agent mixture, any suitable accelerator agent can be used to initiate the localized gelling of the liquid resin. The main criteria that such accelerators should preferably meet are as follows:

(i) to be non-volatile under vacuum;
(ii) to mix quickly and easily with the liquid resin/curing agent mixture;
(iii) to be compatible with the cure of the infusion resin/curing agent system;
(iv) to be readily locatable on the fibrous reinforcement; and
(v) to promote the rapid and efficient cure of the infusing resin system.

In some cases, it is preferable that the resin is an epoxy resin mixed with an amine-curing agent and, in such cases, the accelerator may be a reagent which can react with either the amine-curing agent and/or the epoxy resin to speed up or advance the cure. Typical accelerator agents that can be used to cause the localized gelling of an epoxy resin/amine curing agent mixture are inorganic salts of various metals. Suitable examples of such salts include those described in U.S. Pat. No. 4,668,736, U.S. Pat. No. 5,198,146, U.S. Pat. No. 5,958,593, U.S. Pat. No. 4,101,459 and U.S. Pat. No. 5,442,035, the entire contents of which are incorporated herein by reference. These are known accelerators for the amine cure of epoxy resins.

Mercaptan compounds, such as those of the Capcure® range, can also be used as accelerators. Mercaptan compounds react with and cure epoxy resins very quickly, especially in the presence of tertiary amine curing agents.

The accelerator agent may also be an agent that undergoes a Michael addition reaction with the amine curing agent to form an adduct, which then goes on to react with the epoxy resin to form a highly cross-linked resin matrix. One such accelerator is dipentaerythritol pentaacrylate (Sartomer® 399). Sartomer® 399 is primarily indicated for acrylate polymerisation via the 5-unsaturated residues on the molecule. Its ability to undergo a Michael addition reaction with amine curing agents has also been reported. The reaction between Sartomer® 399 and the resin/amine curing agent mixture results initially in the formation of a rubbery gel. In this form the epoxy resin is effectively immobile in the reinforcement, but retains the potential to undergo an amine cure, either by further reaction in a similar vein, or by the cure mechanism designed for the bulk of the resin infusion.

A disadvantage associated with the use of Sartomer® 399 is its potential to undergo an uncontrollable free-radical polymerization reaction. To reduce the chance of this occurring, inhibitors can be included in the composition. As the Michael addition reaction involving Sartomer® 399 utilized in the present invention does not rely on such free-radical chemistry, the activity and loading of the free-radical inhibitors can be bolstered to further eliminate the risk of the free-radical polymerization reaction occurring, thereby increasing the practicality and safety of this method.

The occurrence of resin depletion observed with the liquid epoxy resins is not as much of a problem with free-radically cured resin systems, such as the unsaturated polyester resins, because, unlike the epoxy resins, these resin systems can be easily modified to gel at a predetermined time following infusion. This allows the gelling to occur rapidly around the time at which the resin infusion is completed and prior to promoting the full thermal cure. This requires the judicious selection of initiators, retarders and inhibitors, which a person skilled in the art would know how to do. However, there may still be instances where the controllable, localized gelling of a free-radically cured resin may still be required.

An example of such an instance is the aforementioned application where the localized gelling of the liquid resin can be used to close off the suction applied by vacuum once the assembly or a region thereof has become fully infused with resin.

The gelling of free-radical resin systems is thermally mediated in the main and hence, can be initiated by localized heating of the composition. Additional components such as inhibitors are usually included in the composition to modify the reaction profile and to delay gelling of the resin by reacting preferentially with the initiating species. Only when these inhibitors are exhausted can the rapid polymerization reaction really 'take hold' and the addition polymerization reaction then promotes rapid resin gelling. Suitable combinations of components to achieve this effect are well known to those skilled in the art.

The rapid production of initiating species may also be produced in other ways, other than thermally. In certain embodiments of the invention, the formation of highly reactive radical species could be readily promoted via the use of catalysts. These can either act as true catalysts, very small proportions functioning well even in the solid phase, or as part of a reduction-oxidation (redox) couple. Certain embodiments of the invention can involve the location of one half of a redox couple on an "accelerator-preg" and the other half in the resin/curing agent mixture. As the polyester resin is infused into the assembly, the interaction between the two halves of the redox couple causes the rapid cure of the unsaturated species present. This reaction will be enough to overcome, at least locally, the effects of the inhibitors in the formulation. Certain metal ions can also be used to catalyze the breakdown of free radical initiators and low concentrations of suitable metal salts can be isolated on the "accelerator-pregs", or, alternatively, applied directly onto or within the fibrous reinforcement itself. It is expected that the free radical initiators undergoing catalyzed fragmentation will also function under thermal initiation. Under thermal initiation, the reaction will proceed at a much more controllable rate. In essence, the object is to promote a degree of 'uncontrolled', reaction at the "accelerator-preg" site. Any of these approaches for localized catalytic initiation of polymerization can act independently of the main reaction chemistry.

The accelerator agent, whether applied neat onto the fibrous reinforcement assembly or positioned within the assembly in the form of a pre-impregnated "accelerator-preg", can be easily applied to selected areas of the assembly where the localized immobilization of the infused liquid resin is required. It will be appreciated that the selective positioning of the accelerator agent will dictate the pattern of pre-cure gelling that results. The pattern of gelling required will depend on each specific application. For example, in some cases, it may be advantageous to engineer the pre-cure gelling pattern so that free channels of non-immobilized resin remain through which residual air or volatile by-products may be removed from the system. This decreases the likelihood of entrapping gaseous species that would contribute to laminate porosity and cause a consequential decrease in the quality of the final structure or component.

In some cases, it will also be advantageous to leave channels of non-immobilized liquid resin within the assembly to enable the liquid resin to flow past the gelled resin, and/or over the top of it. With such an arrangement it will be more difficult for the liquid resin to flow back through the composition once the infusion is complete. As a result, this liquid resin is retained within the desired area of the composition and thus, can be allowed to cure in the normal manner.

Furthermore, the accelerator agent may also be applied to the fibrous reinforcement in the form of one or more lines of accelerator agent applied directly onto the fibrous reinforcement, or as one or more strips of a pre-impregnated "accelerator-preg" applied to the assembly. When the liquid resin comes into contact with the accelerator agent, a reaction between the accelerator and the resin/curing agent mixture will occur and result in the formation of a barrier of gelled resin which may be configured to prevent, or at least impede, the flow of the adjacent regions of liquid resin out of a selected area of the assembly. With this arrangement, the barrier effectively 'grows' from the liquid resin as the reaction with the accelerator takes place.

Alternatively, particular shapes of "accelerator-preg" patch can be used to encourage the formation of gelled or cured resin "pockets" throughout the assembly. These pockets can be used to effectively trap and thus, prevent resin flowing out of a selected area under the effect gravity.

Preferably, following the infusion and final cure of the resin, the final composite component or structure should be indistinguishable from one that has been prepared with no local acceleration, other than the evidently improved quality in the areas prone to resin depletion where the liquid resin has been immobilized within the assembly.

The amount of accelerator applied to the fibrous reinforcement either directly or pre-impregnated within an "accelerator-preg" must be sufficient to impart localized immobilization of the liquid resin in the assembly. In some cases the loading required may be high (>10% by mass). Where this is the case, the accelerator agent will work best where the resin flow rate within the assembly is low. In areas where the flow rate is high, the accelerator is likely to be washed through the assembly and diluted by the resin, as previously discussed. This may reduce the resultant increase in viscosity of the liquid resin that occurs, as well as reducing the localization of the resin immobilization. To allow for this occurrence, different loadings of an accelerator agent can be applied to different regions of the assembly to account for different flow rates, or, alternatively, patches of "accelerator-preg" having different loadings of the accelerator agent can be prepared for immobilizing the liquid resin at different flow rates. For example, an "accelerator-preg" patch or strip can contain a high loading of accelerator for fast resin flow areas, and a lower loading for slow resin flow areas of the composition. Alternatively, a more reactive accelerator can be placed in areas where the flow of resin is fast and a lower reactivity accelerator can be applied to areas where the resin flow is slow.

An advantage of imparting the localized immobilization of the liquid resin by causing the resin to gel by reaction with an accelerator is that during the cure cycle in which the resin composition is initially heated, the viscosity of the gelled regions of the resin remains high, thereby preventing, or at least significantly reducing, the flow of resin out of the gelled regions. This feature is particularly important if the liquid resin infused into the assembly is an epoxy resin. As is known, an initial reduction in viscosity can occur during the heating of the resin for cure and the subsequent increase in viscosity as the cure takes place is usually much slower than the 'pseudo command-cure' that is possible with free radical systems. In the absence of any accelerator, the decrease in viscosity caused by the increase in temperature will, at least for a while, overcome any increase in viscosity as a result of resin advancement and continuing cure. It is during this part of the process that the problems of undesirable resin flow (as this invention is designed to protect against) will be most acute. Usually, insulating materials are used to cover the infused assembly during cure and, if this is the case, the occurrence of resin depletion may only then be apparent on de-molding the final cured component or structure. The problem is also exacerbated by the use of a low viscosity resin system. As is known, many processors who use speed infusion systems favor low viscosity resin systems.

It should also be appreciated that it is common for processors using a vacuum resin infusion process to moderate the level of vacuum applied to the assembly to suit each stage of the manufacturing process. Thus, a hard vacuum will be employed as resin is initially drawn into the reinforcement followed by a softer vacuum when the assembly is fully filled. The maintenance of a lower level of vacuum is important during cure to prevent the occurrence of porosity in the laminate arising from volatile matrix components, dissolved air being liberated or volatile reaction products. Also, the continued application of at least some vacuum assists with consolidation of the structure and achievement of the correct resin/reinforcement ratio. As a consequence of the maintenance of the vacuum, the flow of any low viscosity resin within the assembly is further exacerbated.

Moreover, it is often found difficult to produce a uniform heating distribution on-large molds, such as, for example, a wind turbine blade mold. This can result in extended cure times being required so that areas that are difficult to heat are allowed to reach the required temperature. Hence a further advantage of the immobilization of the resin by gelling in such circumstances is that it effectively gives these areas a head start, although it does not replace the requirement for thermal post curing entirely. Therefore, the judicious placement of such immobilization agent may also obviate the requirement to supply significant additional heating during the cure cycle.

In a further alternative embodiment of the invention, the immobilization agent may include (by itself or as an additive) a viscosity-enhancing material in the form of extra resin which serves to increase the local viscosity of the liquid resin that infuses into a selected area. The extra resin is preferably of higher viscosity than the bulk resin and may be partially cross-linked (B-staged) or an alternative form of resin such as, for example, solid or semi-solid form of resin (for example, solid or semi-solid bisphenol A where the infusing resin is a liquid bisphenol A or other low viscosity epoxy analogue or formulation). In most cases the additional resin will be of higher molecular weight and hence, of higher viscosity than the liquid resin used to impregnate the bulk of fibrous reinforcement. The additional resin can be applied to the fibrous reinforcement either as a paste or as neat application. In addition, the resin may also be applied directly onto the fibrous reinforcement assembly or be impregnated onto or into one or more additional sheets of a carrier substrate (e.g. sections of fabric or fibrous reinforcement) that may then be positioned on or within the fibrous reinforcement assembly. Although there are disadvantages in that the viscosity-enhancing effects may be too localized (i.e. limited to the interlaminar layers of the fibrous reinforcement only), wash out of the additional resin may occur as the liquid resin/curing agent mixture infuses through the fibrous reinforcement and the cure may be affected by dilution of the curing agent in the liquid resin/curing agent mixture, this form of immobilization will be of value in certain applications.

The immobilization agent that is used to increase the viscosity of the liquid resin may include (by itself or as an additive) a thickener or a thixotropic material. Suitable examples of thixotropic materials include hydrophobic silica (e.g. Cabosil®), zeolites, clays, short glass fibers or beads. Such materials can be applied to the assembly dry or as a paste, although care is needed to ensure that efficient mixing occurs with the infusing resin.

If desired, the immobilization agent can be supplemented with one or more non-reactive physical barriers that may be placed at locations where the flow of resin from a particular area, for example under the force of gravity, can be prevented. The barrier may be placed on the surface of the fibrous reinforcement or, where the fibrous reinforcement is composed of numerous sheets, in between those sheets to prevent resin flowing in the 'interlaminar' spaces. However, as a proportion of the resin flow also occurs through the fibrous reinforcement, the barrier should preferably also extend through the fibrous reinforcement. This may cause discontinuity in the assembly and the formation of potentially undesirable resin/barrier interfaces and hence may not be suitable for all applications. In addition, in a vacuum resin infusion process, the presence of a permanent barrier is likely to impede the initial flow of the infusing liquid resin and hence, some areas may be slow to infuse, or may be staved of resin permanently.

The liquid resin may impregnate or infuse into the fibrous reinforcement assembly by any suitable resin infusion or impregnation process. Preferably, the resin is infused by a liquid resin infusion process such as, for example, a VaRTM, RIFT or RTM process.

In the compositions and processes of the present invention, the fibrous reinforcement assembly (fibrous body) may be made from any of the materials mentioned above as possible carrier substrates of the "accelerator-preg" assembly.

The selection of the appropriate curing agent to be mixed with the resin will depend on the type of resin used and a person skilled in the art would readily appreciate how to select appropriate combinations.

For the purpose of illustration only, embodiments of the invention are described in further detail below in reference to the accompanying drawing.

A portion of an exemplary assembly in accordance with the present invention is shown in diagrammatic form at 10 in FIG. 1. The assembly 10 is designed for use in making fiber-reinforced composite articles according the general method wherein an uncured resin having a given viscosity is infused into a fibrous body to form an uncured resin impregnated fibrous body that is then cured to form the final fiber-reinforced composite article. The assembly 10 includes a mold 12 that has a surface 14. The surface 14 may be characterized as having a first location 16 and a second location 18. The assembly 10 further includes a fibrous reinforcement assembly or fibrous body 20. The fibrous body 20 includes a side 22 that is located adjacent to the mold surface 14 and which extends from the first location 16 to the second location 18.

The fibrous body 20 is shown in FIG. 1 as having five layer sections 25, 26, 27, 28 and 29. The layers are depicted in a simplified diagrammatic form with it being understood that the number of woven fabric layers in each layer could be more than the single woven layer that is represented in each layer section.

Immobilization agent is located at selected locations 30*a-c* in layer 25. Corresponding immobilization agent is located in layer 27 at 32*a-c* and in layer 29 at 34*a-c* (see FIG.

4). As can be seen from FIG. 1, the immobilization agent is present at locations that are between the first location 16 and the second location 18. The immobilization agent is shown being present in alternating layers of the fibrous body. If desired, the immobilization agent can be located in all or some of the adjacent layers. When locating the immobilization agent in adjacent layers of fabric, it may be desirable to off set the adjacent locations of immobilization agent vertically.

Arrows 36 represent the flow of resin as it is infused into the fibrous body and flows from the general area of the first location 16 (past the immobilization agent areas 30, 32 and 34) into the general area of the second location 18. It is during this infusion of resin (and curative agent if included) that the immobilization agent interacts with the resin to form immobilized or gelled resin barriers.

Figure 2:
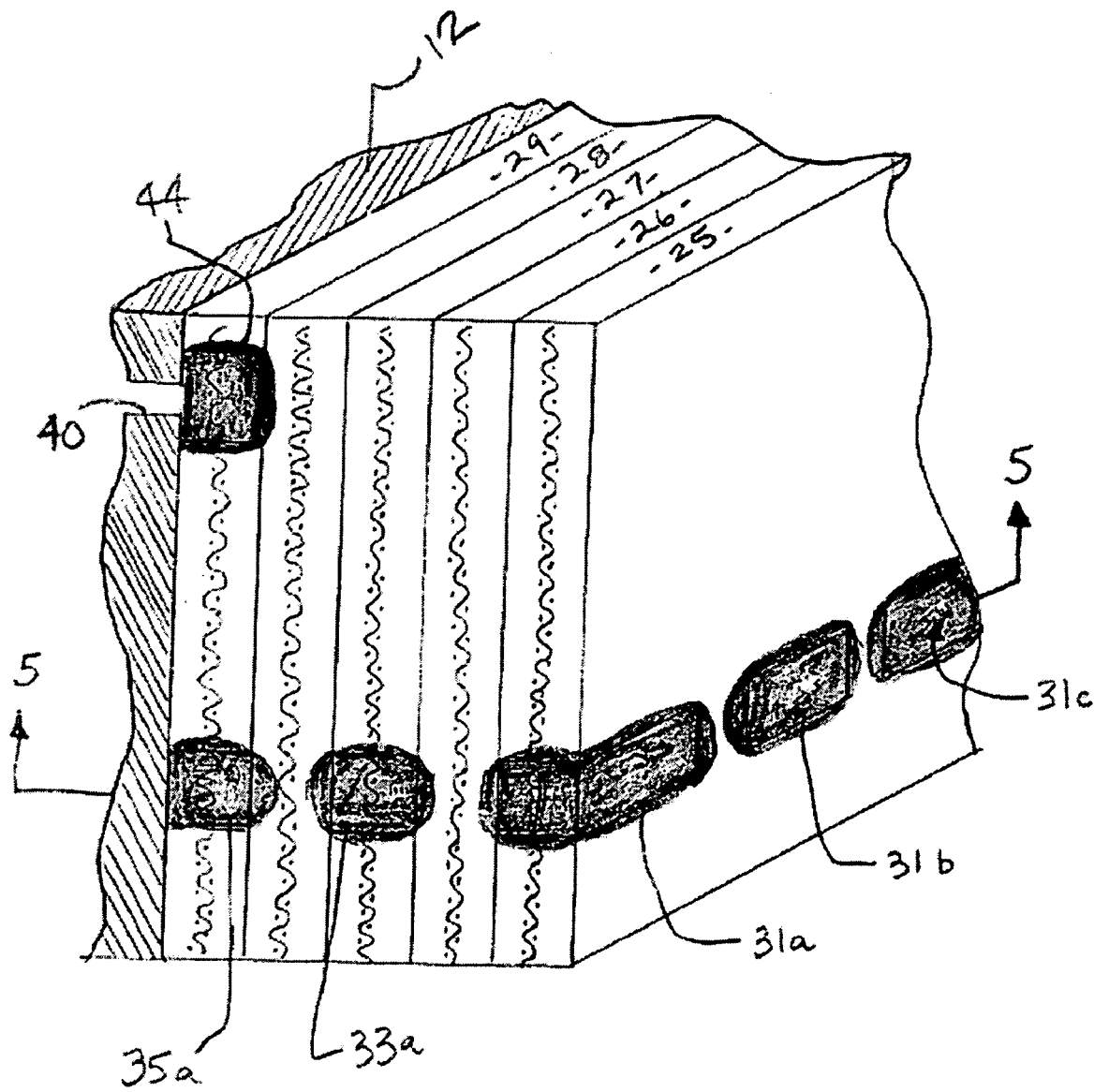
FIG. 2 is a simplified side view of the exemplary assembly as shown in FIG. 1 after resin infusion and the formation of immobilized resin barriers in accordance with the present invention.
Figure 4:
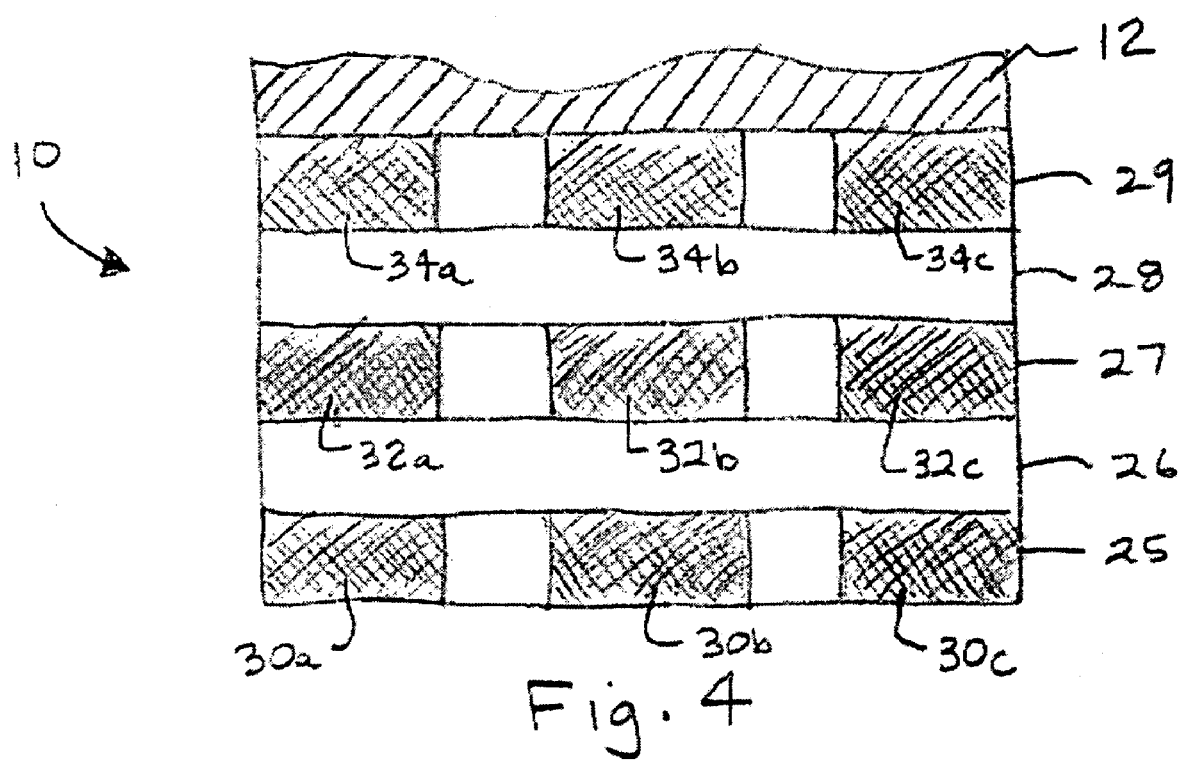
FIG. 4 is a view of FIG. 1 taken in the 4-4 plane.
Figure 5:
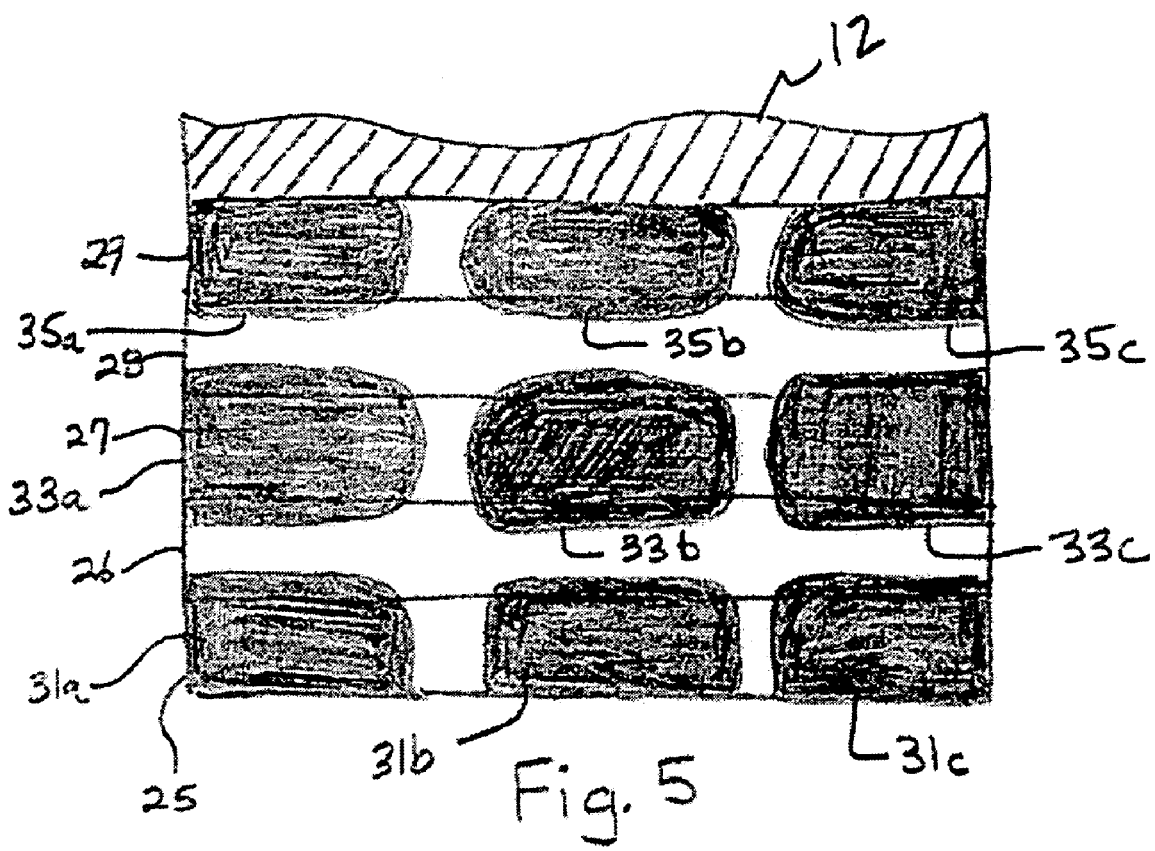
FIG. 5 is a view of FIG. 2 taken in the 5-5 plane.

FIG. 2 is a simplified depiction of the assembly 10 after the resin has been infused into the fibrous body and the immobilized resin barriers have been formed. The immobilized resin barriers are shown for layer 25 at 31a-c. The corresponding immobilized resin barriers are shown for layers 27 and 29 at 33a-c and 35a-c, respectively (also see FIG. 5). As can be seen by comparing FIGS. 1 and 4 with FIGS. 2 and 5, the area of immobilized resin expands as the immobilization agent interacts with the resin to form the immobilized resin barriers. The degree of expansion will vary depending upon numerous factors as discussed above. The immobilization agent may be located to provide discontinuous areas of gel barriers as shown in FIGS. 2 and 5 or the agent may be located closer together, if desired to form a continuous barrier. In either case, the immobilized resin barriers are sufficiently large to prevent or at least restrict the flow of the non-immobilized resin back from the area of the second location 18 to the area of the first location 16. In this way, resin depletion from the area above the barriers (second location 18) is avoided.

The mold 12 also includes outlet 40 that may be used to apply a vacuum and through which resin may flow. As a feature of the present invention, immobilization agent may be located close to the outlet 40 as shown at 42. The immobilization agent is present in a sufficient amount and is located sufficiently close to outlet 40 so that the flow of resin through the outlet 40 will be stopped or at least restricted when the immobilization agent interacts with the infused resin to form an immobilized resin barrier as shown at 44 in FIG. 2.

Figure 3:
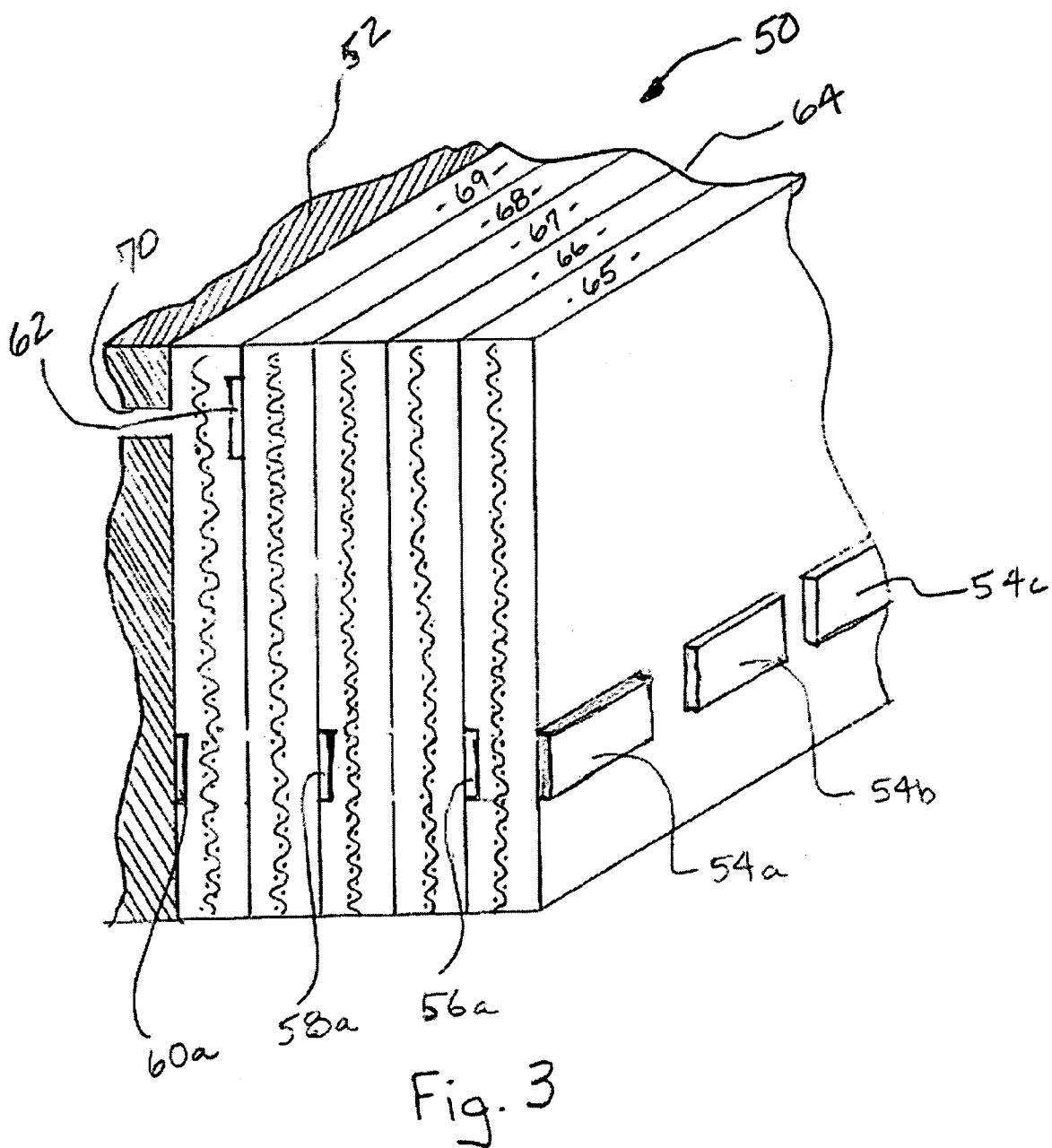
FIG. 3 is a simplified side view of a portion of an exemplary assembly wherein the immobilization agent is located in patches of fiber that located between the layers of the fibrous body.

A portion of another exemplary embodiment of an assembly in accordance with the present invention is shown diagrammatically at 50 in FIG. 3. The assembly 50 is basically the same as assembly 10 shown in FIG. 1, except that the immobilization agent is provided in patches of accelerator-preg as shown at 54a-c, 56a, 58a, 60a and 62. The patches of accelerator-preg are located between the layers of fibrous material (65-69) that form the five layers of the fibrous body 64. As the infused resin contacts the accelerator-preg patches, immobilized resin barriers are formed. The accelerator-preg patches include sufficient immobilization agent and they are sufficiently large to form immobilized resin barriers that prevent or at least restrict the flow of non-immobilized resin down past the barriers during molding. The accelerator-preg patch 62 also contains sufficient immobilization agent and is located sufficiently close to the mold outlet 70 to form an immobilized resin barrier that prevents or at least restricts the flow of resin out through the outlet 70.

Figure 6:
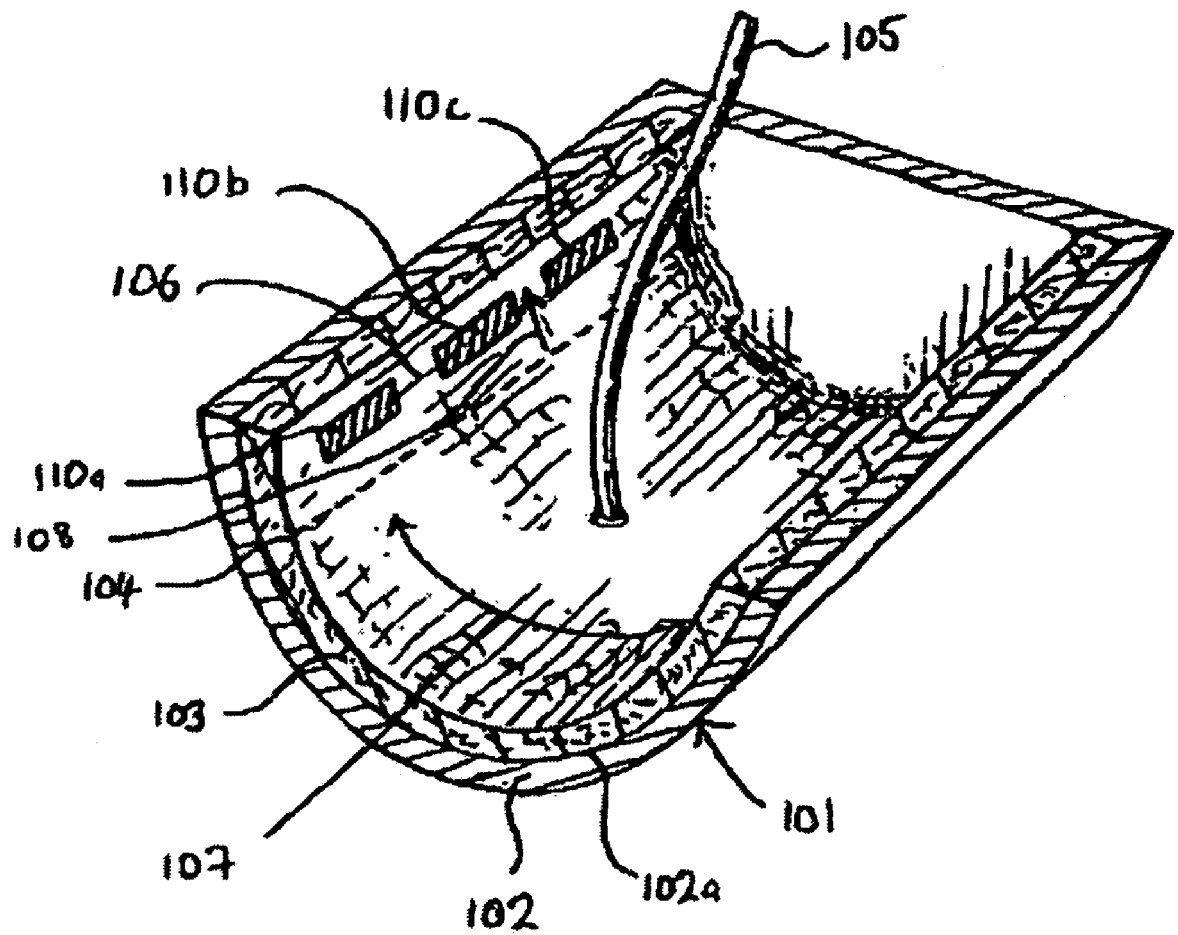
FIG. 6 is a diagrammatic illustration of the end portion of a resin infusion lay-up assembly for a large structural component, in partial section.

FIG. 6 is a diagrammatic illustration of the end portion of a resin infusion lay-up assembly for a large structural component, in partial section.

The end portion of the vacuum resin infusion lay-up assembly 101 shown in FIG. 6 includes a mold 102 for a large structural component, which in this case is a wind turbine blade. In contact with the surface 102a of the mold 102 is a fibrous reinforcement assembly 103, which is covered with an impervious outer sheet 104 to form a sealed vacuum bag.

The fibrous reinforcement assembly 103 consists of several sheets of reinforcing fabric fixed together. In the main body of the lay-up assembly, i.e. the region represented by arrow 107 in FIG. 6, an infusion net is positioned between the fibrous reinforcement 103 and the impervious outer sheet 104.

The vacuum bag is connected to a vacuum pump (not shown), the operation of which results in the evacuation of the vacuum bag (and hence, the fibrous reinforcement 103 encapsulated therein) and causes a liquid resin/curing agent mixture, such as, for example, Prime 20 from SP Systems Ltd. (which is a two-part liquid resin and curative system in which the two ingredients are pre-mixed in the correct ratio just prior to injection/infusion), to be drawn into the fibrous reinforcement assembly 103 from a supply drum (not shown) through the resin inlet tube 105. Resin infusion channels (not shown) are provided to enable the resin to permeate through the fibrous reinforcement assembly 103 in a controlled manner. The lay-up assembly shown in FIG. 6 is designed so that resin flows rapidly across the main body region represented by arrow 107 and then permeates more slowly towards the mold surface 102a. The flow into the vertically inclined sections of the lay-up assembly, such as region 106 shown in FIG. 6, then occurs in the direction of arrow 108. Once fully infused with the liquid resin/curing agent mixture, the resin is then cured to form the wind turbine blade section.

As previously discussed, it has been observed that the liquid resin/curing agent mixture infused into the assembly tends to flow out of certain areas of the assembly before the cure of the resin can be facilitated. The most notable areas where this phenomenon has been observed to occur are the areas surrounding the vacuum suction tubing, which connects the vacuum pump to the assembly, and the areas of the assembly that are in contact with vertically inclined sections of the mould surface, such as the region 106 in FIG. 6. Region 106 corresponds to the glue flange of the wind turbine blade and the occurrence of resin depletion in this part of the blade structure can be particularly detrimental to the to the mechanical properties and performance of this flange.

Therefore, to prevent liquid resin/curing agent mixture from flowing out of this region of the lay-up assembly, "accelerator-preg" patches 110a, 110b and 110c are positioned on and/or within the fibrous reinforcement 103 (as shown in FIG. 6) prior to the infusion of the liquid resin/curing agent mixture. These patches are composed of one or more sheets of fabric (or any other suitable fibrous carrier material) that are impregnated with an accelerator substance which is capable of reacting with the liquid resin/curing agent mixture to impart its localized gelation, as hereinbefore defined.

As the liquid resin/curing agent mixture infuses into the vertically inclined region 106 of the fibrous reinforcement assembly 102, it comes into contact with the accelerator substance and the gelling reaction then occurs. This gelling reaction increases the viscosity of the liquid resin/curing agent mixture in the vicinity of the "accelerator-preg" patch, which in turn prevents, or at least minimizes, the occurrence of resin depletion from this region due to the effect of gravity. The resin can then be cured in the normal manner to form a wind turbine blade having a substantially uniform distribution of resin throughout its entire structure, including the glue flange.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. An assembly for use in making a fiber-reinforced composite article according to a method wherein an uncured resin having a given viscosity is infused into a fibrous body to form an uncured resin impregnated fibrous body that is then cured to form said fiber-reinforced composite article, said assembly comprising:

a mold comprising a surface having a first location and a second location;

a fibrous body having a side that is located adjacent to the surface of said mold wherein said side of the fibrous body extends from said first location to said second location; and an immobilization agent associated with said fibrous body, said immobilization agent comprising an accelerator agent and being located between said first and second locations and being present in a sufficient amount to increase the viscosity of at least a portion of the infused resin to form an immobilized resin barrier, said resin barrier being sufficiently large to restrict the flow of said resin between said first and second locations.

2. The assembly for use in making a fiber-reinforced composite article according to claim 1 wherein said immobilization agent comprises a thixotropic agent.

3. The assembly for use in making a fiber-reinforced composite article according to claim 1 wherein said immobilization agent comprises a carrier substrate that is impregnated with said accelerator agent.

4. The assembly for use in making a fiber-reinforced composite article according to claim 3 wherein said carrier substrate comprises a plurality of fibers.

5. The assembly for use in making a fiber-reinforced composite article according to claim 1 wherein said immobilization agent is located at spaced locations so as to provide a plurality of immobilized resin barriers.

6. The assembly for use in making a fiber-reinforced composite article according to claim 1 wherein said immobilization agent is located at spaced locations so as to provide a single immobilized resin barrier.

7. The assembly for use in making a fiber-reinforced composite article according to claim 1 wherein said fibrous body comprises at least two layers of fibers and wherein said immobilization agent is located in some or all of said layers of fibers.

8. The assembly for use in making a fiber-reinforced composite article according to claim 3 wherein said fibrous body comprises at least two layers of fibers and wherein said immobilization agent is located between some or all of said layers of fibers.

9. The assembly for use in making a fiber-reinforced composite article according to claim 1 wherein said mold comprises a resin outlet through which resin can flow from said fibrous body and wherein said immobilization agent is also located adjacent said resin outlet so as to restrict flow of resin through said outlet when said immobilized resin barrier is formed.

10. An assembly for use in making a fiber-reinforced composite article according to a method wherein an uncured resin having a given viscosity is infused into a fibrous body to form an uncured resin impregnated fibrous body that is then cured to form said fiber-reinforced composite article, said assembly comprising:

a mold comprising a surface including an outlet through which resin from said uncured resin impregnated fibrous body can flow;

a fibrous body having a side that is located adjacent to the surface of said mold at said outlet;

an immobilization agent associated with said fibrous body, said immobilization agent comprising an accelerator agent and being present in a sufficient amount to increase the viscosity of at least a portion of the infused resin to form an immobilized resin barrier, said resin barrier being sufficiently large and located sufficiently close to said outlet to restrict the flow of said resin through said outlet.

11. An assembly for use in making a fiber-reinforced composite article according to a method wherein an uncured resin having a given viscosity is infused into a fibrous body to form an uncured resin impregnated fibrous body that is then cured to form said fiber-reinforced composite article, said assembly comprising:

a mold comprising a surface having a first location and a second location;

a fibrous body having a side that is located adjacent to the surface of said mold wherein said side of the fibrous body extends from said first location to said second location;

resin that has been infused into said fibrous body, said resin being located at both said first and second locations;

an immobilized resin barrier, said resin barrier being sufficiently large to restrict the flow of said resin between said first and second locations, said immobilized resin barrier being formed by contacting said resin with an immobilization agent during infusion of said resin into said fibrous body and wherein said immobilization agent comprises and accelerator agent.

12. The assembly for use in making a fiber-reinforced composite article according to claim 11 wherein said immobilization agent comprises a thixotropic agent.

13. The assembly for use in making a fiber-reinforced composite article according to claim 11 wherein said immobilization agent comprises a carrier substrate that is impregnated with said accelerator agent.

14. The assembly for use in making a fiber-reinforced composite article according to claim 13 wherein said carrier substrate comprises a plurality of fibers.

15. The assembly for use in making a fiber-reinforced composite article according to claim 11 wherein said fibrous body comprises at least two layers of fibers and wherein said immobilization agent is located in some or all of said layers of fibers.

16. The assembly for use in making a fiber-reinforced composite article according to claim 13 wherein said fibrous body comprises at least two layers of fibers and wherein said immobilization agent is located between some or all of said layers of fibers.

17. The assembly for use in making a fiber-reinforced composite article according to claim 11 that comprises a plurality of immobilized resin barriers.

18. The assembly for use in making a fiber-reinforced composite article according to claim 17 wherein said mold comprises a resin outlet through which resin can flow from said fibrous body and wherein said immobilized resin barrier is located sufficiently close to said outlet to restrict the flow of said resin through said outlet.

19. An assembly for use in making a fiber-reinforced composite article according to a method wherein an uncured resin having a given viscosity is infused into a fibrous body to form an uncured resin impregnated fibrous body that is then cured to form said fiber-reinforced composite article, said assembly comprising:
- a mold comprising a surface including an outlet;
- a fibrous body having a side that is located adjacent to the surface of said mold at said outlet;
- resin that has been infused into said fibrous body, said resin being located at said outlet
- an immobilized resin barrier located adjacent to said outlet, said resin barrier being sufficiently large to restrict the flow of said resin to said outlet, said immobilized resin barrier being formed by contacting said resin with an immobilization agent during infusion of said resin into said fibrous body wherein said immobilization agent comprises an accelerator agent.

20. The assembly for use in making a fiber-reinforced composite article according to claim 11 wherein said resin comprises an epoxy resin and a curing agent.

21. The assembly for use in making a fiber-reinforced composite article according to claim 19 wherein said resin comprises an epoxy resin and a curing agent.

22. In an assembly for use in making a fiber-reinforced composite article according to a method wherein an uncured resin having a given viscosity is infused into a fibrous body to form an uncured resin impregnated fibrous body that is then cured to form said fiber-reinforced composite article, the improvement comprising controlling the flow of said resin within said fibrous body by introducing an immobilization agent into said fibrous body at one or more selected locations, said immobilization agent comprising an accelerator agent and being present in a sufficient amount at said one or more selected locations to increase the viscosity of at least a portion of the infused resin to form one or more immobilized resin barriers, said resin barriers being sufficiently large to restrict the flow of said resin within said fibrous body.

* * * * *